(12) United States Patent
Guidetti

(10) Patent No.: US 6,609,610 B2
(45) Date of Patent: Aug. 26, 2003

(54) PROCESS FOR CONVEYING ARTICLES, FOR INSTANCE FOR AUTOMATED PACKAGING INSTALLATIONS, AND A DEVICE THEREFOR

(75) Inventor: Dario Guidetti, Novara (IT)

(73) Assignee: Cavanna SpA (IT)

( * ) Notice: Subject to any disclaimer, the term of this patent is extended or adjusted under 35 U.S.C. 154(b) by 25 days.

(21) Appl. No.: 09/757,734

(22) Filed: Jan. 9, 2001

(65) Prior Publication Data

US 2001/0007299 A1 Jul. 12, 2001

(30) Foreign Application Priority Data

Jan. 10, 2000 (EP) .............................. 00830005

(51) Int. Cl.[7] .............................................. B65G 13/02
(52) U.S. Cl. .................. 198/689.1; 198/457.03
(58) Field of Search ............................ 198/456, 457.01, 198/457.03, 689.1, 597

(56) References Cited

U.S. PATENT DOCUMENTS 3,250,375 A  *  5/1966  Bontruis et al. .... 198/457.03 X
3,608,895 A  *  9/1971  Kalven .............. 198/457.03 X
4,193,491 A  *  3/1980  James et al. ........ 198/457.03 X
5,358,234 A  * 10/1994  Boriani et al. ....... 198/689.1 X
6,202,828 B1 *  3/2001  Roskam .................. 198/457.03

FOREIGN PATENT DOCUMENTS

| DE | 885556 | 12/1961 | |
| EP | 0491168 A1 | 6/1992 | .............. 198/689.1 |
| EP | 0761545 A1 | 3/1997 | |
| JP | 62-201726 | * 9/1987 | ............ 198/457.01 |

* cited by examiner

*Primary Examiner*—James R. Bidwell
(74) *Attorney, Agent, or Firm*—Dorsey & Whitney LLP

(57) ABSTRACT

In order to convey articles in a conveying device incorporated, for example, within an automatic packaging plant, a first conveyor and a second conveyor are used, the first one being arranged upstream of the second one in the direction of feeding of the articles conveyed. The conveyors have respective conveying directions forming between them an angle equal, for example, to 90°. The articles are received on the second conveyor in a positive and unconfined conveying condition.

20 Claims, 2 Drawing Sheets

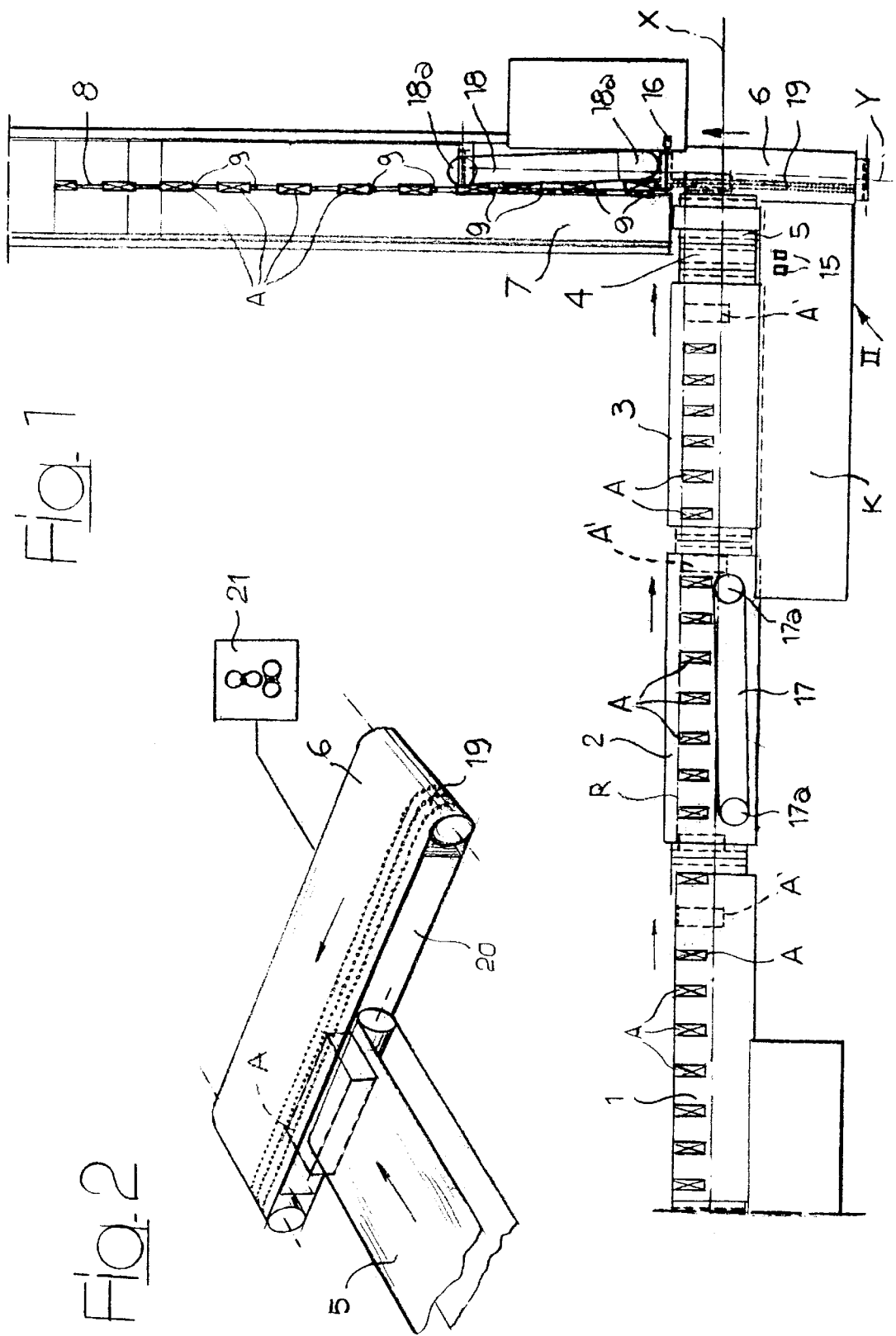

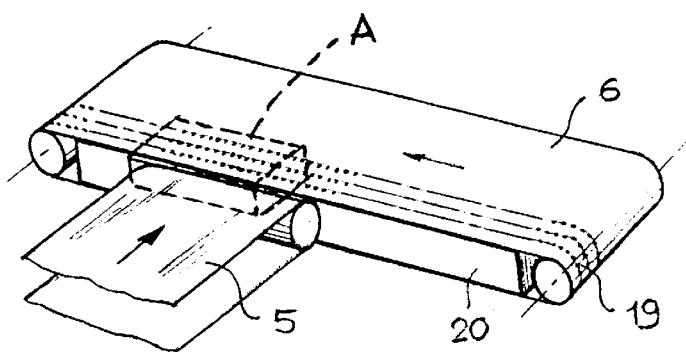
Fig_3
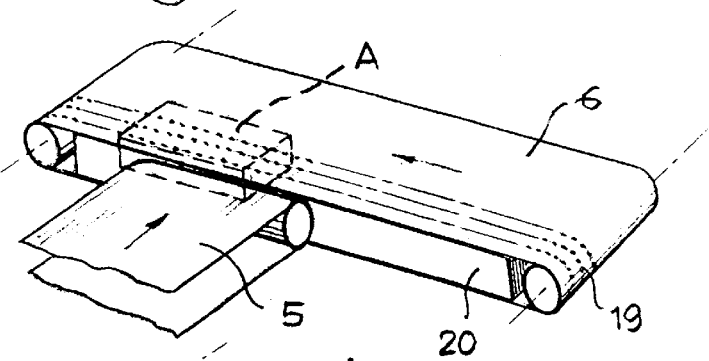
Fig_4
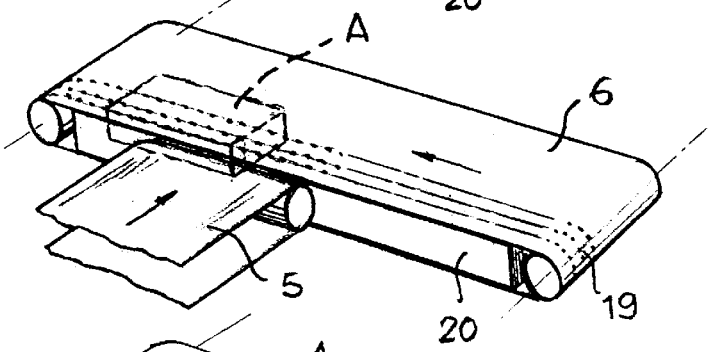
Fig_5
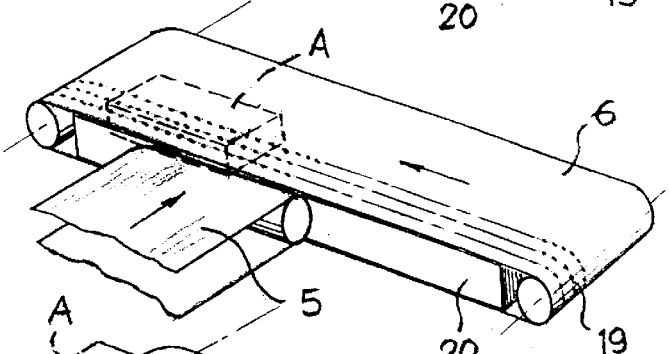
Fig_6
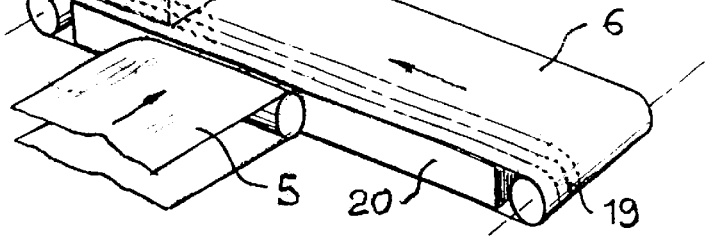
Fig_7

PROCESS FOR CONVEYING ARTICLES, FOR INSTANCE FOR AUTOMATED PACKAGING INSTALLATIONS, AND A DEVICE THEREFOR

The present invention deals with the problem of conveying articles and has been developed with particular attention to possible use within the context of automatic packaging plants, for example for food products such as confectionery products.

In plants of this kind there is frequently the need to perform, often in a coordinated manner, the following operations:

deviation of the feeding path of the articles being packaged through a considerable angle (for example, an angle of 90° so as to cause the articles, after deviation, to be fed along a path perpendicular with respect to the previous feeding path);

modification of the orientation of the articles with respect to their feed path, for example the articles which are fed "crosswise" are subsequently fed "lengthwise" or vice versa; and "synchronization" of the articles, this term being understood as meaning the operation which produces a uniform flow of articles which are exactly equidistant with respect to each other and are able to arrive at the stations intended to carry out operations on the said articles (for example wrapping machines, etc.) at exactly predetermined instants.

The object of the present invention is to provide a solution able to perform in an entirely satisfactory manner all the handling operations described above or also only some of them, all of the above being achieved taking into account two basic requirements which are of increasing importance:

being able to handle flows of articles fed at very high speeds (for example in the region of 1000 articles/minute); and ensuring that the packaging plant operating in accordance with the invention is able to handle equally well or more or less equally well (i.e. with minimum modifications) differently sized articles.

According to the present invention, this object is achieved by means of a method having the characteristic features referred to specifically in the claims which follow. The invention also relates to the associated device.

The invention will now be described, purely by way of a non-limiting example, with reference to the accompanying drawings in which:

FIG. 1 shows a perspective general view of part of an automatic packaging plant incorporating the solution according to the invention;

FIG. 2 shows, in greater detail, part of the plant according to FIG. 1, viewed in the direction of viewing corresponding more or less to the arrow II shown in the same FIG. 1; and FIGS. 3 to 7 show, in an ideal animated sequence, the step involving transfer of an article being packaged in a device according to the invention.

FIG. 1 shows part of an automatic packaging plant. This may consist, for example, of a plant for the automatic packaging of food products such as confectionery products (biscuits, wafers, chocolate bars, etc.).

The general features of these plants are to be regarded as being fully known and therefore do not need to be described in detail here, also because they are not relevant for the purposes of understanding and implementing the invention. For this purpose it will be sufficient to mention that the plant portion or section shown in the FIG. 1 is intended to receive at its entry end (for example from an oven or from a cooling tunnel, which is not shown in FIG. 1, but which may be imagined to be located on the bottom left in the same figure) a continuous flow or substantially continuous flow of articles A consisting, for example, of articles which can be likened to prism-shaped bars.

The reference to this configuration is purely exemplary in nature and must therefore not be regarded as limiting the scope of the invention.

At the end of the feed path (involving a movement which occurs from left to right and from bottom to top with reference to the viewpoint in question) in the plant section shown, the articles A are conveyed to a further handling station (not shown, but also of the known type) consisting, for example, of a packaging machine. This may consist, again by way of example, of a packaging machine of the type commonly known as a "flow-pack" machine.

During their movement, the articles A are fed on the conveyors indicated by the progressive numbers 1 to 8. With the exception of the conveyor 8, these conveyors preferably consist of belt-type conveyors (of the known type, being devices which have a very widespread use in the automatic packaging industry, in particular with regard to food product applications), each comprising an endless strip of flexible material so as to define an upper section or branch for conveying the articles A. The belts of the conveyors are wound, at their ends, onto respective transmission rollers and the movement thereof is performed by means of respective drive systems (not shown) associated with at least one control member K (for example of the type commonly known as a "PLC", i.e. Programmable Logic Controller) which manages operation of the plant as a whole.

In particular, it is known that the drive systems of at least some of the conveyors 1 to 8 may be selectively operated at different speeds (notwithstanding, obviously, the need to ensure overall feeding of the flow of articles at the desired speed), so as to vary selectively the distance separating the various articles such that correct synchronization of the flow of said articles may be achieved.

The last conveyor in the plant section shown (i.e. the conveyor indicated by the reference number 8 and intended to act as a conveyor supplying the processing station, for example a packaging machine situated downstream of the plant section in question) preferably consists of a belt or motorized-chain conveyor intended to feed the articles A by means of respective positive-type drive systems (typically so-called dogs 9 mounted on the corresponding drive belt or chain). The above considerations regarding synchronization of the movement or timing of the movement of the articles A are also applicable to the conveyor 8.

All that described hitherto basically corresponds to constructional criteria and operating principles which may be regarded as known and therefore do not need to be described in detail here.

The solution according to the invention, in the preferred embodiment illustrated here, aims to perform in an integrated manner three different operations for handling the articles A being fed through the plant section shown in FIG. 1.

Firstly, a deviation in the direction of feeding of the articles A is performed: in this connection it can be seen that the conveyors 1 to 5 are positioned in a cascade arrangement so as to produce feeding of the articles A in a respective conveying direction (indicated by the line X) which forms an angle of the 90°—and is therefore perpendicular—with respect to the conveying direction (indicated by the line Y) along which the conveyors 6, 7 and 8 operate. From this point of view, as will be obvious to persons skilled in the art, the solution according to the invention is, however, not limited to an angle of deviation of 90°: the angle formed by the conveying directions X and Y (actually defined by the conveyors 5 and 6 arranged in cascade with each other) could also have a different value.

Secondly, in the example of embodiment illustrated, the solution according to the invention also performs rotation of the articles A with respect to their direction of feeding.

In fact, whereas on the conveyors 1 to 5 the articles A are fed, as it were "crosswise" or "widthwise", namely with their longer extension perpendicular to the conveying direction X, on the conveyors 6 to 8 the same articles are fed "lengthwise", namely with their longer extension oriented in the conveying direction Y.

The solution according to the invention is also able to operate in dual mode, namely with the articles A initially fed "lengthwise" being then fed "crosswise" or "widthwise".

Finally, even though this is not immediately obvious from the drawings, at least one of the conveyor belts indicated by 4 and 5 is provided with a unit comprising an optical gate or barrier (or any similar sensor) indicated by 15. By interacting—in accordance with known principles—with the control unit K and the belt drive systems operated by it, the unit 15 performs synchronization of the flow of the articles A being fed (crosswise in the example of embodiment shown) on the conveyors 1 to 5. The result of this synchronizing operation is to produce, at the entry end of the conveyor 5, a uniform flow of articles A which are exactly equidistant with respect to each other and which are fed synchronized with the operating cycle of the plant components (not specifically shown) situated downstream and intended to process the said articles A.

Another unit comprising an optical gate or barrier (or similar sensor), indicated by 16, may be provided in the transition zone between the conveyors 6 and 7 so as to be able to perform possible further synchronization, after the flow of articles A has been deviated from the conveying direction X into the conveying direction Y.

The fact of having referred to this further operation as a possible operation is intended to take into account the fact that, for reasons which will be explained more clearly below, this further synchronizing operation often does not need to be carried out. At least in some embodiments of the invention, therefore, this operation and the components (unit 16) intended for this function may be dispensed with.

In any case, when envisaged, this further synchronizing operation essentially consists of a refinement of the synchronizing operation already performed in a substantial—if not complete—manner in the region of the belts 4 and/or 5.

The reference numbers 17 and 18 denote two additional motorized conveyors—of the known type—which are typically configured in the form of an endless belt or band which is wound around respective end pulleys 17a, 18a having a vertical axis.

The additional conveyors 17 and 18 are arranged above the conveyors 2 and 7 in a position such as to allow them to interact with the articles A which are being fed on these conveyors so as to achieve, owing to a general inclined arrangement with respect to the directions X and Y, transverse displacement of the articles A with respect to their feed path.

Although being structurally identical or in any case similar to each other, the two conveyors 17 and 18 in reality perform slightly different functions.

For the sake of simplicity of the explanation, reference will be made first of all to the conveyor 18 situated downstream of the transition zone between the conveyors 5 and 6, in which zone the change in the direction of feeding of the articles A occurs.

The conveyor 18 essentially has the function of receiving the articles A which arrive on the conveyor 7—being fed "lengthwise" in the example of embodiment shown—from the conveyor 6 along a path which is at least slightly offset (in a transverse direction relative to the direction Y) compared to the path of the feeding movement of the dogs (or similar drive elements) 9 with which the conveyor 8 is provided, said conveyor being intended to feed the articles A towards the processing station situated downstream of the plant section shown.

Basically, the function of the conveyor 18 is that of receiving the articles A in a transversely displaced position with respect to the dogs 9 and, by making use of its inclined or skew arrangement with respect to the direction Y, ensuring that, while continuing to be fed on the conveyor 7, the articles A are pushed so as to be gradually introduced into the spaces between successive dogs 9. In this way, the articles A, which are initially disengaged from the dogs 9, are gradually taken up by the said dogs 9 which ensure successive positive driving thereof towards the processing station S. This result may be clearly understood from the top part of FIG. 1 where it can be seen that the articles A, which are initially freely deposited on the conveying section of the conveyor 7, are gradually engaged by the dogs 9.

The position of the conveyor 18 is adjustable, in particular as regards the position of the entry end 18a with respect to the flow of articles A being fed, so as to be able to take into account the possible variation in the dimensions of the articles A.

Operating in a substantially identical manner, the conveyor 17 (shown here as being located at the conveyor 2, but this choice is not to be regarded as obligatory in any way) performs the function of axially displacing the articles A so as to position one of the sides of the said articles A along an ideal line of adjustment R consisting of a straight line extending in the direction of feeding X of the articles A.

The possibility of adjusting the assembly position of the additional conveyor 17 (both as regards the position of the entry end 17a and as regards the position of the exit end 17b with respect to the direction of feeding of the articles A) is intended to ensure that alignment of one of the sides of the products with the line R may be performed in any case, depending on the dimensions of the articles A. By modifying the position of the conveyor 17 it is therefore possible to adjust the device shown so as to align one of the sides of the articles A with the line R, thus adapting the plant to possible variations in size of the articles A which are being processed.

This possibility has been schematically shown in the bottom part of FIG. 1, where it can be seen that the abovementioned aligning effect may be achieved, by means of adjustment of the conveyor 17, independently of the size of the articles: more specifically, in addition to the profile of an article A having dimensions corresponding to those of the articles visible in the remainder of the figure, the forms of other articles A', capable of being processed by the plant by means of a suitable adjusting operation which can be easily performed by modifying the conveyor 17, have been shown and indicated by broken lines.

Examining, with specific reference to FIG. 2, the transition zone of the articles A between the conveyor 5 and 6, it will be understood that, in the currently preferred embodiment of the invention, the conveyor 6 is a conveyor having a belt provided, at least in the vicinity of the exit end of the conveyor 5, with a perforated zone or band 19.

The conveyor 6 also has, associated with it, a suction chamber 20 situated inside the closed loop of the conveyor belt in a zone towards which the exit end of the conveyor 5 extends. The chamber 20 is intended to be connected to a source of pressure 21 below atmospheric pressure consisting, for example, of a vacuum line present in the premises where the plant is installed, or a source of pressure below atmospheric pressure of a different kind (for example, a Venturi-effect vacuum source, etc.).

The overall effect which can be achieved is that of ensuring—by means of activation of the vacuum source 21—that a vigorous flow of air from the external environment towards the suction chamber 20 occurs through the perforated portion 19 of the belt section 6 which is passing over the suction chamber 20 at that particular moment.

As a result of the suction effect thus achieved, the articles A which are located on the conveyor belt 6 at that particular moment are retained on the said belt.

The application of a solution of this type (namely the use of vacuum sources) in order to achieve a retaining effect for the articles being transported on a conveyor belt is known in the art. In the previous known applications, however, the mechanism in question is used in order to ensure adherence between the articles and the belt transporting them also when the said belt is subject to sudden accelerations such as those which occur, for example, when performing a synchronizing operation.

In the solution described here, however, this mechanism is used mainly so as to achieve, between the belt 6 and the articles A being conveyed thereon, a conveying condition which may be defined as "positive and unconfined".

This expression, which is also used in the claims below, may be better understood by considering, for example, how the articles A are transported, on the one hand, by any of the conveyors 1 to 5 and 7 and, on the other hand, by the chain conveyor 8.

In the case of the belt conveyors 1 to 5 and 7, the articles are transported in a condition which may be defined as being equally non-positive and unconfined.

"Unconfined" means that the articles A are per se free to move and slide with respect to the upper sections of the conveyors transporting them, there being no confining structures such as recesses, compartments, dogs or driving teeth, etc., which confine the said articles, preventing movement thereof with respect to the conveyors. For the same reasons, the conveying condition is to be regarded as non-positive in the sense that the articles A follow the movement of the belts simply owing to the fact that they rest on the upper sections of the said belts, without there being any actual driving relationship.

Conversely, once the conveyor 8 is reached, the driving condition of the articles A is to be regarded as confined (the dogs 9 are in fact such that they prevent relative movement of the articles A with respect to the conveyor 8, in particular with regard to a possible relative backward movement of the articles with respect to the dogs 9 pushing them) and at the same time positive in nature, since the dogs 9 drive the articles A and determine their feeding movement.

In the case of the conveyor 6, however, there is a conveying condition which is positive (in that the articles A are actually retained on the upper section of the conveyor 6 by the action of the air-like flow induced by the vacuum created in the suction chamber 20) but at the same time unconfined, in that the belt 6 does not have any arrangements such as recesses, compartments or driving teeth which per se prevent the movement of the articles A with respect to the upper section of the belt 6.

In the remainder of the description reference will again be made to the (currently preferred) embodiment based on the use of a vacuum source acting via a suction chamber 20 situated inside the path of the belt 6 and therefore able to act from underneath the free section of the said belt 6. It will be understood, however, that the positive and unconfined conveying condition described above may also be achieved in other ways so that the specific embodiment illustrated here does not have to be regarded in any way as limiting the scope of the invention.

For example, again with reference to devices already currently used in automatic packaging plants, in particular for food products, it is possible to imagine replacing the suction chamber 20 situated inside the belt 6 by one or more blowing members which produce, from the outside, an air-like flow directed towards the upper section of the belt 6 and such that it has the effect of keeping the articles A firmly fixed onto the upper section of the said conveyor 6 as a result of the aerodynamic thrust produced by the abovementioned air-like flow. In this case, the presence of the perforated zone 19 in the belt 6 is no longer required. Blowing members of the type described are already used, as mentioned, in certain automatic packaging plants for food products, for example, in order to produce locally air flows or jets intended to expel defective packaging and/or products from the plant.

Obviously, together with numerous other constructional variants, it is possible to envisage combining the action of a vacuum source with the action of blowing members.

Whatever the specific embodiment chosen, the Applicant has been able to observe that, in an entirely unexpected manner, by performing deviation of the feed path of the articles (also through a very wide angle—90° in the example of embodiment illustrated) using, as the receiving conveyor, a conveyor on which the articles are received in a positive and unconfined driving condition, it is possible to perform the abovementioned deflection operation in a very precise manner, while keeping close control over the position of the articles. This is also the case when the articles are being fed (both upstream and downstream of the deflection point along the path) at fairly high speeds. In particular, the experiments carried out by the Applicant show that it is possible to perform deflection in optimum conditions even in the case of flows of articles at a rate of about 700–1000 articles/minute corresponding to linear feed speeds of the articles equal to about 1.5 meters/second.

Without wishing to be limited to any specific theory in this connection, the Applicant has reason to believe that this result is due to the fact that the absence of the confining action ensures that the ballistic effect associated with the inertia of the articles supplied onto the receiving conveyor (along a path inclined—in the example of embodiment shown along a path perpendicular—with respect to the feed path of the said receiving conveyor) may be effectively and gradually absorbed without giving rise to rebound effects. These effects, together with the consequent possible loss of control over the position of the articles, are intrinsically associated with the presence of confining structures such as cells, blades, driving teeth, etc., on the receiving conveyor.

The sequence shown in FIGS. 2 to 7 illustrates the feed path of the articles A in the transition zone between the conveyors 5 and 6 as may be detected, for example, using a stroboscope system.

From the figures it is possible to note that the "capturing" of the articles A by the conveyor 6 at the exit of the conveyor 5 occurs gradually.

As the articles A gradually leave the conveyor 5 and pass above the zone of the conveyor 6 where the vacuum is present (perforated band 19), of the two vectorial components which make up the instantaneous movement path (one oriented in the direction X and the other oriented in the direction Y), the former gradually diminishes while the latter increases. All this continues until, once the article A is located substantially entirely on the conveyor 6 (FIG. 7), the second component actually becomes the sole component, deflection of the feed direction thus having been achieved.

The deflection is therefore obtained by making the articles A follow a curved path resulting from the fact that the vectorial component of movement in the direction X is superimposed on and then completely replaces the component of movement in the direction Y.

The fact that the transfer occurs gradually ensures that the deflection of the direction of feeding through 90° automatically causes a variation in the orientation of the articles A with respect to the original direction of feeding.

In fact, in the example of embodiment shown, the articles A are initially fed "crosswise" on the conveyors 1 to 5 and then fed "lengthwise" on the conveyor 6 to 8. Obviously an entirely similar result would be achieved if the articles were to be fed in an original manner lengthwise and then fed crosswise.

All this is achieved without requiring any subsequent reorientation of the articles once their direction of movement has undergone deflection.

The above is also applicable to the synchronizing operation. The result of the synchronizing operation performed (in the region of the conveyors 4 and 5) while the articles are fed in the direction X in fact remains unchanged or substantially unchanged also once the said articles have been transferred onto the conveyor 6 and are being fed in the direction Y.

At least in the majority of the cases, therefore, it is no longer necessary to perform a further synchronizing operation once the articles are moving in the direction Y as a result of the deflecting operation.

This possibility is particularly advantageous in the case where (as in the example specifically illustrated) the articles are initially fed crosswise (i.e. with their shorter extension parallel to the direction of feeding) and are then fed lengthwise (i.e. with their longer extension parallel to the direction of feeding).

Carrying out a synchronizing operation in fact frequently requires the need to create storage zones for the articles (or "buffers"), the length of which, measured in the direction of feeding of the articles, is clearly dependent (for the same feed rate of the articles, expressed in number of articles/minute) upon the extension of the articles in the feed direction.

In any case, even in cases where there is no need to form storage zones, the linear feed speed of the articles, for the same rate of processing of the articles (number of articles/minute), is proportional to the extension of the articles in the direction of feeding.

In the case of an article which has, for example, a length equal to three times its width, the fact of being able to carry out the synchronizing operation on articles being fed crosswise instead of on articles being fed lengthwise results in the possibility of operating at linear feed speeds reduced to one third: this fact is of great significance in view of the fact that the synchronizing operation results in the need to apply to the articles accelerations (also in terms of a slowing down of their feed speed) which essentially constitute percentage variations in the feed speed. The possibility of being able to operate at lower speeds is therefore associated with the possibility of applying correspondingly lower accelerations, avoiding the risk of the articles becoming detached from the conveyors transporting them.

The example of embodiment of the invention to which the accompanying drawings refer in fact envisages the possibility of performing a further synchronizing operation (during transition between the conveyors 6 and 7) once the articles are being fed in the direction Y. However, as already mentioned, this synchronizing operation (if envisaged, since in numerous applications it is possible to dispense with it entirely) serves only as a refinement of the synchronized condition already substantially achieved beforehand.

Obviously, the principle of the invention remaining unaffected, the constructional details and the embodiments may be widely varied with respect to that described and illustrated, without thereby departing from the scope of the present invention as defined by the claims which follow.

What is claimed is:

1. A method of conveying articles subject to a ballistic effect being fed in a conveying plant comprising a first conveyor and a second conveyor, the first one being arranged upstream of the second one in the direction of feeding of the articles subject to said ballistic effect, said first conveyor and said second conveyor having respective conveying directions forming an angle between them, the method comprising the operation of conveying onto said second conveyor the articles arriving from the said first conveyor, the said articles being received on said second conveyor in a positive an unconfined conveying condition without impacting a surface perpendicular to the direction of feeding, and quenching said ballistic effect.

2. The method of claim 1, comprising the operation of providing conveying directions for said first conveyor and said second conveyor which are substantially perpendicular to each other.

3. The method of claim 1, comprising the operation of performing a synchronizing operation for the flow of said articles before transfer from said first conveyor onto said second conveyor, the synchronized condition thus obtained remaining substantially unchanged also on said second conveyor.

4. The method of claim 1, comprising the operation of carrying out on said articles, before transfer onto said second conveyor, an adjusting action to align at least one side of said articles with an adjusting line parallel to the direction of conveying of the articles on said first conveyor.

5. The method of claim 3, comprising the operation of carrying out a further operation involving marginal adjustment of said synchronized condition after the articles have been transferred onto said second conveyor.

6. The method of claim 1, comprising the operation of the achieving said positive and unconfined conveying condition on said second conveyor by inducing an air-like flow in correspondence of said articles upon transfer onto said second conveyor.

7. The method of claim 6, wherein said air-like flow is induced by providing, in a position inside said second conveyor, a zone having a pressure below atmospheric pressure and providing in said second conveyor openings for the air-like flow towards said zone having a pressure below atmospheric pressure.

8. The method of claim 6, wherein said air-like flow is induced by means of air-like blowing onto said articles upon transfer onto said second conveyor.

9. A device for conveying articles subject to a ballistic effect being fed a conveying plant, the device comprising a first conveyor and a second conveyor, the first one being arranged upstream of the second one in the direction of feeding of the articles, said first conveyor and said second conveyor having respective conveying directions forming an angle between them, wherein said second conveyor is configured so as to receive the articles subject to a ballistic effect arriving from said first conveyor in a positive and unconfined conveying condition without impacting a surface perpendicular to the direction of feeding.

10. The device of claim 9, wherein the conveying directions of said first conveyor and said second conveyor are substantially perpendicular to each other.

11. The device of claim 9, comprising a unit for synchronizing the flow, adapted for adjusting said articles before transfer from said first conveyor onto said second conveyor.

12. The device of claim 9, comprising an adjusting unit for aligning at least one side of said articles with an adjusting line parallel to the direction of conveying of the articles on said first conveyor before transfer onto said second conveyor.

13. The device of claim 11, comprising a further synchronizing unit for marginal adjustment of said synchronized condition, adapted for adjusting the said articles after the latter have been transferred onto said second conveyor.

14. The device of claim 9, wherein said second conveyor comprises means for inducing an air-like flow in correspondence with said articles upon transfer onto said second conveyor so as to achieve said positive and unconfined conveying condition.

15. The device of claim 14, wherein said means for inducing an air-like flow comprise a chamber defining a zone having a pressure below atmospheric pressure, situated in a position inside said second conveyor as well as openings for the air-like flow towards the said zone having a pressure below atmospheric pressure, provided in said second conveyor.

16. The device of claim 14, wherein said means for inducing an air-like flow comprise means performing an air-like blowing action on said articles upon transfer onto said second conveyor.

17. The method of claim 1, wherein said articles subject to a ballistic effect are conveyed onto said second conveyor at a rate of about 700 to 1000 articles per minute.

18. The method of claim 1, wherein said articles subject to a ballistic effect are conveyed onto said second conveyor at a linear feed speed of about 1.5 meters per second.

19. The method of claim 9, wherein said second conveyor receives said articles at a rate of about 700 to 1000 articles per minute.

20. The method of claim 9, wherein said second conveyor receives said articles at a linear feed speed of about 1.5 meters per second.

* * * * *